United States Patent [19]

Haneda

[11] Patent Number: 5,517,486
[45] Date of Patent: May 14, 1996

[54] INFORMATION RECORDING MEDIUM AND METHOD OF RECORDING OR REPRODUCING OPTICAL INFORMATION EMPLOYING THE SAME

[75] Inventor: Norihisa Haneda, Shizuoka, Japan

[73] Assignee: Fuji Photo Film Co., Ltd., Japan

[21] Appl. No.: 306,257

[22] Filed: Sep. 7, 1994

Related U.S. Application Data

[63] Continuation of Ser. No. 37,690, Mar. 25, 1993, abandoned, which is a continuation of Ser. No. 282,303, Dec. 9, 1988, abandoned.

[30] Foreign Application Priority Data

Dec. 10, 1987 [JP] Japan .................................. 62-313378
Oct. 26, 1988 [JP] Japan .................................. 63-270535

[51] Int. Cl.$^6$ ........................................................ G11B 3/70
[52] U.S. Cl. ...................... 369/280; 369/275.4; 369/277
[58] Field of Search ......................... 369/275.1, 275.3, 369/275.4, 277, 278, 280, 281, 279, 276

[56] References Cited

U.S. PATENT DOCUMENTS

| | | | |
|---|---|---|---|
| 4,363,116 | 12/1982 | Kleuters et al. . | |
| 4,385,303 | 5/1983 | Akahira et al. | 369/278 |
| 4,481,620 | 11/1984 | Murakami | 369/109 |
| 4,517,668 | 5/1985 | Takaoka et al. | 369/275.4 X |
| 4,660,191 | 4/1987 | Maeda et al. | 369/44.37 |
| 4,674,070 | 6/1987 | Tajima et al. | 369/275.4 X |
| 4,819,210 | 4/1989 | Miura et al. | 369/100 |
| 4,877,667 | 10/1989 | Hattori et al. | 369/282 |
| 4,965,153 | 10/1990 | Imataki et al. | 369/277 |

FOREIGN PATENT DOCUMENTS

| | | | |
|---|---|---|---|
| 58-102347 | 6/1983 | Japan | 369/277 |
| 61-237239 | 10/1986 | Japan . | |

OTHER PUBLICATIONS

Bulthuis et al. (Bulthuis), *IEEE Spectrum*, "Ten billion bits on a disk," Aug. 1979, pp.26–33.

*Primary Examiner*—Tan T. Nguyen
*Attorney, Agent, or Firm*—Sixbey, Friedman, Leedom & Ferguson; Gerald J. Ferguson, Jr.; David S. Safran

[57] ABSTRACT

An information recording medium including a disc-shaped substrate and a recording layer for optically recording and reproducing information with a laser beam where the recording layer is disposed on the substrate. The surface of the substrate is provided with a tracking guide including grooves having a depth of 200 to 600 angstroms and a width of 0.3 to 0.6 μm. A method of optically recording information and a method of optically reproducing recorded information using the information recording medium are also disclosed.

6 Claims, 2 Drawing Sheets

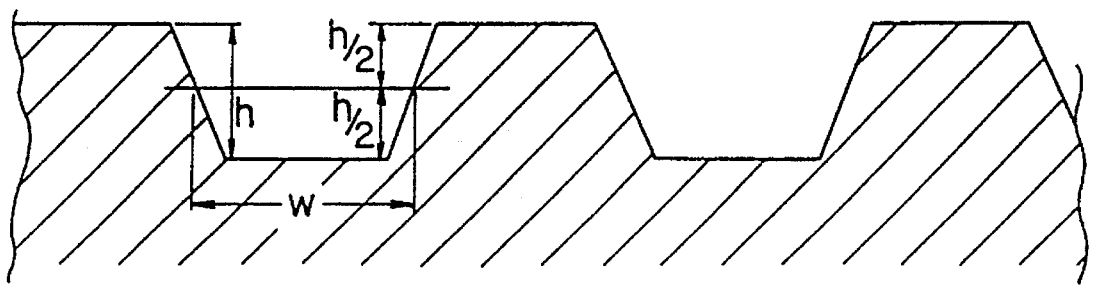
FIG. 1
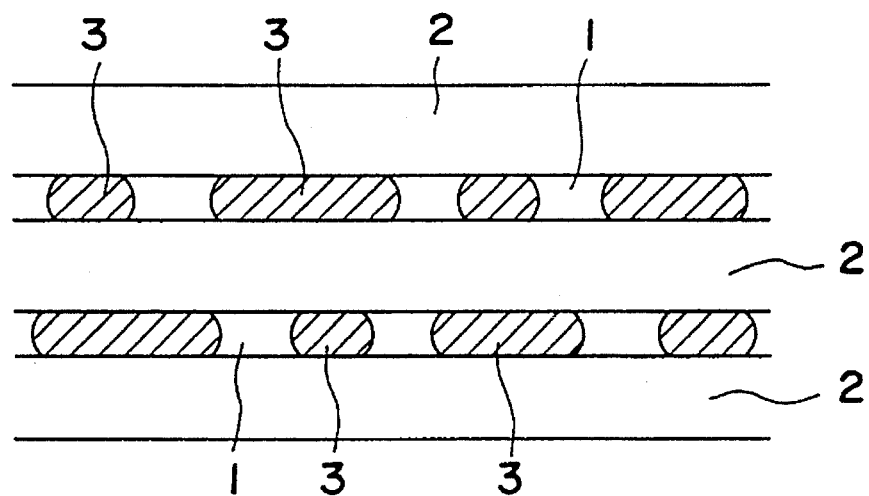
FIG. 2
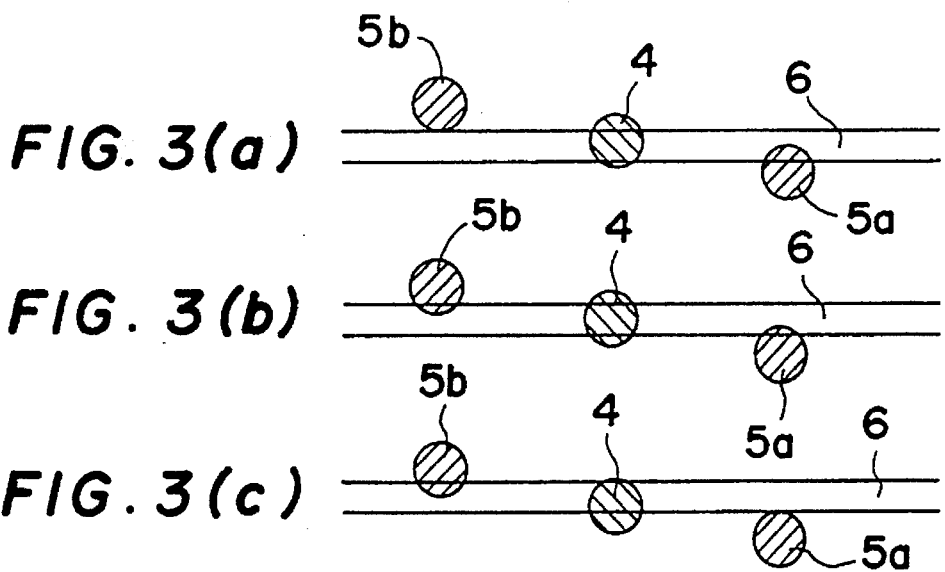
FIG. 3(a)
FIG. 3(b)
FIG. 3(c)

INFORMATION RECORDING MEDIUM AND METHOD OF RECORDING OR REPRODUCING OPTICAL INFORMATION EMPLOYING THE SAME

This application is a continuation of Ser. No. 08/037,690, filed Mar. 25, 1993, now abandoned, which itself is a continuation of Ser. No. 07/282,303, filed Dec. 9, 1988, now abandoned.

BACKGROUND OF THE INVENTION

1. Field of the Invention

The present invention relates to an information recording medium which is advantageously employed for recording and/or reproducing optical information of signals by means of a laser beam of high energy density. The invention further relates to a method of optically recording information on the information recording medium and a method of optically reproducing the recorded information from the information recording medium.

2. Description of Prior Art

Information recording media utilizing a beam of high energy density such as a laser beam have been developed in recent years and are now put into practical use. Such recording medium is generally called "optical disc", and the practical applications thereof have been found, for example, as a video disc and an audio disc as well as a disc memory for a large-capacity computer and a large-capacity static image file. Among these media, a compact disc (referred to as "CD") is now widely used as an audio disc for reproducing a music or the like.

The compact disc generally comprises a disc-shaped transparent substrate of plastic material which has been beforehand provided with pits having information in the form of EFM (Eight to Fourteen Modulation) digital audio signals, a light-reflecting thin film of Al or other metal having a high reflectance which is arranged on the substrate and a protective film coated over the reflecting thin film. Reading of information from CD is conducted by irradiating CD with a laser beam, and under irradiation the signals of CD format are read out based on the variation of reflectance caused by the presence or absence of the pits.

CD is generally rotated at a fixed linear speed of 1.2 to 1.4 m/sec. according to the predetermined CD standard to record an information thereon, and CD is required to allow a long recording time (at longest 74 min.) using a signal-recording area within the region between inner diameter of 45 mm and outer diameter of 116 mm under the conditions of pit width of 0.8 μm and track pitch of 1.6 μm. The conventional audio compact disc is used only for reproducing information. Such compact disc has been beforehand provided with pits on the substrate (accordingly not provided with a recording layer), so that the compact disc has such problems that information cannot be recorded or edited thereon on the users' side. Accordingly, development of a compact disc of DRAW (Direct Read After Write) type (i.e., disc capable of being written) is required.

The above requirement is also addressed to discs for memorizing various documents, data, static image files, etc., discs of DRAW type for CD-ROM (Read Only Memory) or CD-I (Interactive).

A known information recording medium of DRAW type basically comprises a disc-shaped transparent substrate made of plastic or glass material and a recording layer made of metal or semi-metal such as Bi, Sn, In and Te provided on the substrate. Writing of information on the recording medium (optical disc) can be conducted, for example, by irradiating the medium with a laser beam. Under irradiation with the laser beam, the irradiated area of the recording layer of the optical disc absorbs the energy of beam and a rise of temperature locally occurs, and as a result, a chemical and physical change is caused to alter optical characteristics of the recording layer in the irradiated area, whereby recording of information can be made. Reading of information from the optical disc is also conducted by irradiating the disc with a laser beam. The recorded information can be reproduced by detecting a reflected light or a transmitted light corresponding to the alteration in the optical characteristics of the recording layer.

In such known information recording media of DRAW type, however, the information cannot be recorded unless the medium is rotated at a high linear speed to have wide spaces between adjoining pits during the recording procedure, and hence it is almost impossible to record information thereon according to the CD system in which high density recording is made at a low linear speed. Even if the medium would record information thereon, the recorded information could not be read out therefrom by means of a commercially available CD player, because the commercially available CD player can read only an optical disc having a high reflectance for a reproducing light such as a laser beam.

As described above, writing of information on the optical disc or reading of information from the optical disc is generally conducted by irradiating a predetermined portion of the disc surface with a laser beam. Recently, as a large amount of information is desired to be recorded on the optical disc, it has been proposed to increase density of the units for record of information in the form of such as pits in recording area of the disc. However, the increase of density of the recording units causes difficulty in precisely irradiating the predetermined portion of the disc with a laser beam, so that optical discs in recent years are generally provided on their surfaces with a tracking guide (also referred to as "pre-groove") having such a sectional form as shown in FIG. 1 of attached drawings for precisely guiding the laser beam to the predetermined irradiation area (generally referred to as "tracking").

The conventional information recording medium of DRAW type is prepared in accordance with the standard defined by ISO (International Organization for Standardization). The depth and width of a groove are defined to give excellent properties to the medium, as described in a publication of "Data on Optical Disc Standardization" (Optical Industry Promotion Association, compiled by Optical Disc Meeting, p. 113, published in Dec. 3, 1987). As to the depth and width of the groove, the above-mentioned publication teaches as follows.

In the case that information is recorded within a groove, the depth of the groove is not less than 700 angstroms and the width of the groove is not less than 0.8 μm. When information is recorded on a land portion (i.e., between grooves), the depth thereof is not less than 800 angstroms and the width thereof is not more than 0.6 μm. In those cases, the optical disc shows excellent properties.

Accordingly, the recording of information is made utilizing a groove having the above-mentioned size, and generally the recording is made on the land portion rather than within the groove because the land portion has a higher reflectance than the groove, that is, a difference of the amount of a reflecting light between an area having a pit and an area not having a pit is larger in the land portion than within the groove.

In a conventional CD, grooves having the above-mentioned size are generally provided. However, it has been confirmed by the present inventor that even in the case of recording information through forming pits on the recording layer by irradiating the above-defined groove on the recording layer with a laser beam, the recorded information can be hardly reproduced using a commercially available CD player which is used for reading information by a three-beam tracking method.

In more detail, when information is recorded on the recording layer having the above-mentioned grooves by irradiating the grooves with a laser beam and forming pits thereon, each of the pits is apt to enlarge (or spread) in the radial direction and the size of the pit becomes too large, whereby occurrence of errors increases in the reproduction of information signals, or tracking precision tends to lower. The reason is assumed that the optical disc of CD format is recorded with information of high density at a lower linear speed as compared with the conventional optical disc, so that heat is easily stored in the disc to bring about the above-described pit enlargement. If the recording power is reduced for avoiding such pit enlargement, there arises other problem that the recording of information is not made completely. The pit enlargement is markedly observed in the case of forming pits on the land portion where any wall does not exist on the edge, but also observed in the case of forming pits within the groove.

SUMMARY OF THE INVENTION

It is an object of the present invention to provide an information recording medium of DRAW type which is improved in tracking properties.

It is another object of the invention to provide a method of optically recording information on the above information recording medium, particularly a method of optically recording information of CD format signals at a fixed linear speed of low level using the recording medium.

It is a further object of the invention to provide a method of optically reproducing information from the above information recording medium in which the recorded signals can be reproduced under irradiation of the medium with a laser beam by a three-beam tracking method through precisely tracking, particularly a method of optically reproducing information using the above medium in which the recorded signals can be reproduced utilizing a commercially available CD player.

There is provided by the present invention an information recording medium comprising a disc-shaped substrate and a recording layer for recording and reproducing optically recorded information by means of a laser beam which is provided on the substrate, wherein the surface of said substrate is provided with a tracking guide comprising grooves having a depth of 200 to 600 angstroms and a width of 0.8 to 0.6 μm.

There is also provided by the invention a method of optically recording information on the above-mentioned information recording medium which comprises irradiating the groove of the tracking guide having the recording layer thereon with a laser beam under rotating the recording medium at a fixed linear speed.

There is further provided by the invention a method of optically reproducing information from the above-mentioned information recording medium recorded with information which comprises irradiating the groove of the tracking guide with a laser beam by a three-beam tracking method under rotating the recording medium at a fixed linear speed.

Preferred embodiments of the information recording medium of the present invention are as follows:

1) the information recording medium characterized in that the groove of the tracking guide has a depth of 300 to 500 angstroms.

2) the information recording medium characterized in that the groove of the tracking guide has a width of 0.4 to 0.5 μm.

3) the information recording medium characterized in that the disc-shaped substrate is made of a polymethacrylic resin or a polycarbonate resin.

Preferred embodiments of the method of optically recording information of the invention are as follows:

1) the method characterized in that the recording of information is conducted by irradiating the groove of the tracking guide having the recording layer thereon with a laser beam under rotating the recording medium at a fixed linear speed of 1.2 to 2.8 m/sec.

2) the method characterized in that EFM signals of CD format are recorded by irradiating the groove of the tracking guide having the recording layer thereon with a laser beam under rotating the recording medium at a fixed linear speed.

Preferred embodiment of the method of optically reproducing information of the invention is as follows:

1) the method characterized in that reproduction of information is conducted by irradiating the groove of the tracking guide having the recording layer thereon with a laser beam under rotating the recording medium at a fixed linear speed of 1.2 to 2.8 m/sec.

The above-mentioned width of the groove is a width measured at a half-depth position of the depth of the groove.

The information recording medium of the present invention is prominently improved in the tracking accuracy as compared with conventional information recording media of similar type having pre-groove. In detail, the recording medium of the invention is provided with pre-groove and is recorded with information by forming pits on the groove. Further, the groove of the recording medium of the invention is shallower and narrower than that of the conventional medium, so that the pits formed on the groove are small and uniform on the size. Hence, errors are reduced in the reproduction procedure. Moreover, the information recorded on the medium can be reproduced using a commercially available CD player, and particularly the medium is excellent in the tracking servo-gain properties when subjected to reproduction procedure according to a three-beam tracking method, resulting in almost no occurrence of sound-skipping or similar troubles. In addition to those advantages, the recording medium of the invention has high playability, and random access is easily attained in the recording medium.

BRIEF DESCRIPTION OF DRAWINGS

FIG. 1 is a schematic view illustrating a section of a substrate of the information recording medium according to the present invention.

FIG. 2 is a schematic view illustrating condition of pits formed on the groove of the tracking guide of the information recording medium according to the present invention.

FIG. 3 is a schematic view illustrating beam spots of three beams located on the recording layer of the information recording medium of the present invention in a three-beam tracking method.

DETAILED DESCRIPTION OF THE INVENTION

Figure 4:
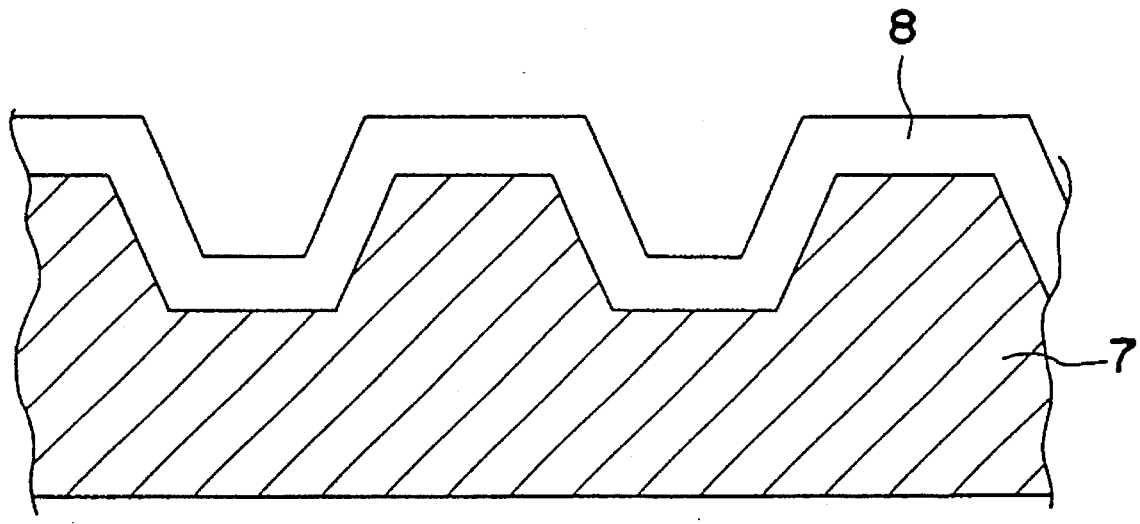
FIG. 4 is a schematic view illustrating a section of the information recording medium according to the present invention.

In the information recording medium of the present invention, the width of the groove is made smaller than that of a conventional optical disc according to the ISO standard or a conventional optical disc of CD format to restrain heat conductivity, whereby pits having smaller width and uniform size can be formed on the groove. Owing to those pits, the information recording medium shows high tracking properties and is almost free from errors in the reproduction procedure of information signals. In detail, when pits are formed on the groove, the enlargement of pit is restrained by the wall being present between the edge of the groove and the land portion, and thereby small-sized uniform pits can be obtained. Further, the depth of the groove is made smaller than that of the conventional one to obtain satisfactory reflectance, whereby the information recorded on the medium of the invention can be reproduced using a commercially available CD player.

In the optical disc according to the ISO standard, the difference of the amount of reflecting light between the land portion and the groove becomes smaller, as the depth of the groove is smaller and as the width of the land portion is nearer to that of the groove, so that the track-crossing signals decrease and track-counting errors frequently occur at the access stage. However, the above-mentioned form of the groove are not disadvantageous in the recording or reproducing procedure of CD format signals.

In the information recording medium of the invention, a surface of the disc-shaped substrate is provided with a tracking guide. The tracking guide has such a section as shown in FIG. 1, in which h indicates a depth of the groove and w indicates a width of the groove. The depth of the groove is required to be in the range of 200 to 600 angstroms, and the width of the groove is required to be in the range of 0.8 to 0.6 µm. The width (indicated by w in FIG. 1) of the groove is a value measured at a half-depth position of the depth of the groove (i.e., value measured at the position of h/2 as shown in FIG. 1).

The depth of the groove is preferably in the range of 300 to 500 angstroms, and the width of the groove is preferably in the range of 0.4 to 0.5 µm.

The information recording medium of the invention has a recording layer for writing (i.e., recording) and reading (i.e., reproducing) information by means of a laser beam which is provided on the above-mentioned substrate.

In the method of optically recording information according to the invention, under rotating the above-mentioned recording medium at a fixed linear speed, the groove of the tracking guide having the recording layer thereon is irradiated with a laser beam. Preferably, under rotation of the medium at a fixed linear speed of 1.2 to 2.8 m/sec., the groove of the tracking guide having the recording layer thereon is irradiated with a laser beam to record digital signals such as EFM signals of CD format.

In the present invention, recording of information is conducted on the groove of the tracking guide, whereby pits of desired shape can be efficiently obtained. Further, the depth of the groove is specifically determined to obtain high reflectance by which the recorded information can be reproduced using a commercially available CD player.

The condition of pits formed on the groove of the tracking guide of the recording medium according to the invention is shown in FIG. 2. FIG. 2 is a schematic top view illustrating the tracking guide, in which the numbers 1, 2 and 3 indicate groove, land portion and pit, respectively. It is confirmed that the width of the pit formed on the narrow groove according to the invention is restricted by the walls of the grooves and is almost the same as that of the groove.

As described above, in the information recording medium of the invention, pits having small width and uniform size can be formed on the groove to record information, and a high reflectance can be obtained. Hence, when the medium is subjected to a reproduction procedure utilizing a three-beam tracking method which is generally employed method for reproducing CD format signals, the medium is prominently improved in the tracking servo-gain properties, and hardly suffers from occurrence of sound-skipping phenomenon or the like caused by unfavorable environmental influences such as vibration.

The three-beam tracking method is well known as one of the tracking servo methods, and the three beams are composed of one main beam for reading signals and two sub-beams for tracking. Examples of other tracking servo methods include push-pull tracking method and DPD method. In the push-pull tracking method and DPD method, a beam for reading signals also serves as a tracking servo, that is, one beam simultaneously has two functions of reproducing and tracking.

The three-beam tracking method advantageously employed in the invention is now described in more detail below referring to FIG. 3.

FIG. 3 is a schematic view illustrating an example of beam spots of the three beams applied onto the recording layer of the information recording medium according to the three-beam tracking method. The three beams comprises a main beam 4 for reading out signals and two sub-beams 5a, 5b for tracking which are arranged before and after the main beam 4 interposing a track 6 (i.e., row of pits on the groove in the invention) therebetween. The sub-beam 5a is arranged in the right side of the main beam 4, and the sub-beam 5b is arranged in the left side of the main beam 4. In the reproduction of signals, tracking condition is controlled by the use of the sub-beams 5a, 5b. FIG. 3-(b) shows favorable positioning of the sub-beams 5a, 5b. The beam spots of the sub-beams 5a, 5b are located on the track in almost the same ratio (or amount), so that the amount of a reflecting light from the sub-beam 5a equals to that of a reflecting light from the sub-beam 5b, and accordingly the output for a pick-up for releasing a laser beam from the tracking servo becomes 0. As a result, the tracking condition is not altered. In each of FIG. 8-(a) and FIG. 8-(c), the beam spots of the sub-beams 9a, 9b are located on the track in different ratio. In these cases, the amount of a reflecting light from the sub-beam 5a differs from that of a reflecting light from the sub-beam 5b, and hence the tracking condition should be corrected. Thus, the tracking process based on the three-beam tracking method is performed.

The method of optically reproducing information according to the invention is characterized in that the groove of the tracking guide of the medium recorded with information is irradiated with a laser beam according to the three-beam tracking method under rotating the medium at a fixed linear speed. The reproduction of information is preferably conducted by rotating the medium at a fixed linear speed of 1.2 to 2.8 m/sec.

When the information is reproduced by the three-beam tracking method mentioned above, the tracking servo-gain properties are highly improved and occurrence of sound-skipping phenomenon is prominently reduced. Further, the method of the invention can be advantageously employed especially in the case of reproducing digital signals such as EFM signals of CD format.

Furthermore, the information recorded on the recording medium of the invention can be reproduced by means of CD players for various tracking processes such as those used in push-pull tracking method or DPD method as well as in the three beam tracking method, because small and uniform sized pits are formed on the recording layer of the medium.

A schematic view illustrating a section of the information recording medium according to the present invention is shown in FIG. 4, in which the number 7 indicates a disc-shaped substrate and the number 8 indicates a recording layer which is provided on the substrate.

The information recording medium of the invention can be prepared, for example, by the following process.

The substrate having a pre-groove thereon can be prepared by molding a plastic material such as polycarbonate resin and a polyacrylic resin or laminating a resin layer having a pre-groove on an appropriate substrate such as a plastic plate or a glass plate, and those processes are generally known.

The information recording medium of the invention differs in the depth of the groove from a conventional information recording medium which is the same type in the relationship between the refractive index of the substrate and the wavelength of the employed laser beam. In general, the pre-groove of the recording medium of the invention is made shallower and narrower than that of the conventional one.

An intermediate layer may be provided on the substrate to prevent escape of heat energy of the laser beam from the recording layer. When the intermediate layer is provided on the substrate, there arises a thickness variation of the resulting intermediate layer between on the bottom portion of the pre-groove and on the top portion of the wall, that is, the thickness of the resulting intermediate layer on the bottom portion of the pre-groove differs from that on the top portion of the wall. The thickness variation (i.e., difference of the thickness) depends on the average thickness of the intermediate layer, but generally is in the range of 200 to 400 angstroms. Accordingly, the depth of the pre-groove can be determined referring to the data on the variation of the thickness of a conventional intermediate layer used in the similar system. For determining the most preferred depth of the pre-groove, a substrate having various pre-grooves of different depth is beforehand prepared, and an intermediate layer is formed thereon. Then, the thickness of the intermediate layer is measured at the above-mentioned portions, and the preferred depth of the pre-groove is determined in consideration of the aforementioned definition (i.e., definition on the relationship between the depth and the width of the groove). Thus, even after the intermediate layer is formed, the depth of the pre-groove provided on the substrate can be precisely determined.

The intermediate layer can be formed on the substrate by known coating processes such as spin coating and dip coating.

Examples of the intermediate layers formed on the substrate by a coating process include the above-mentioned heat insulating layer, a light-reflecting layer and a sensitivity-increasing layer (gas-generating layer).

The heat insulating layer can be prepared, for example, by a process comprising dissolving a polymer material (e.g., polymethyl methacrylate, acrylic acid-methacrylic acid copolymer, styrene-maleic anhydride copolymer, polyvinyl alcohol, N-methylol-acrylamide copolymer, styrene-sulfonic acid copolymer, styrene-vinyltoluene copolymer, chlorinated polyethylene, chlorosulfonated polyethylene, nitrocellulose, polyvinyl chloride, polyester, polyimide, vinyl acetate-vinyl chloride copolymer, ethylene-vinyl acetate copolymer, polyethylene polypropyrene and polycarbonate) in an appropriate solvent to prepare a coating solution, and coating the solution on the substrate.

The thickness (average thickness) of the intermediate layer is determined in consideration of various properties required for the intermediate layer. Generally, the thickness of the intermediate layer is in the range of 100 to 1,000 angstroms.

If desired, other additional layers such as an undercoating layer can be interposed between the intermediate layer and the substrate.

On the substrate (or the intermediate layer, or other additional layer), a recording layer is provided.

Examples of the material employed for the recording layer include metals such as Te, Zn, In, Sn, Zr, Al, Cu and Ge; semi-metals such as Bi, As and Sb; semiconductors such as Ge and Si; alloys thereof; and mixtures thereof. Also employable are sulfides, borides, silicon compounds, carbides and nitrides of those metals or semi-metals; and mixtures of those compounds and metals.

The recording layer can be formed on the substrate (or an additional layer optionally provided on the substrate) by a known process such as vapor-deposition, sputtering or ion-plating using the above-mentioned materials. The recording layer may be composed of a single layer or plural layers. The thickness of the recording layer is generally in the range of 100 to 5,500 angstroms from the viewpoint of optical density required for optically recording of information.

On the recording layer is preferably provided a protective layer. The protective layer preferably is a laminate (i.e., laminated sheet) consisting essentially of a flexible protective layer made of a flexible resin material and a rigid protective layer made of a rigid resin material. The laminate is placed on the recording layer in such a manner that the flexible protective layer faces the recording layer.

Examples of the flexible resin materials include polyurethane, polyvinylidene chloride, ethylene-vinyl acetate copolymer, a silicone rubber, a styrene-butadiene rubber and polyacrylic acid esters. The flexible resin material is coated on the recording layer by a known method such as a solution coating, a latex coating and a hot melt coating, and if desired, the coated layer is subjected to other treatments such as a drying treatment and a heat treatment, to give a flexible protective layer. The thickness of the flexible protective layer generally is in the range of 100 angstroms to 5 μm, preferably in the range of 0.3 to 3 μm.

Examples of the rigid resin materials include ultraviolet-curing resins and thermosetting resins. The rigid resin material is coated on the above-obtained flexible protective layer by a known method such as a solution coating, and if desired, the coated layer is subjected to other treatments such as an irradiation of ultraviolet rays and a heating treatment, to give a rigid protective layer. The thickness of the rigid protective layer generally is in the range of 0.1 to 10 μm, preferably in the range of 1 to 3 μm.

A thin film of an inorganic material such as silicon dioxide, tin oxide and magnesium fluoride or a polymer material such as a thermoplastic resin and a photo-setting resin may be formed on the free surface of the substrate (surface not facing the recording layer) by means of vacuum deposition, sputtering process or coating process in order to increase resistance to damage and resistance to moisture.

A recording medium of two substrates combined-type can be prepared by combining two substrates having the above-described structure using an adhesive, etc. A recording medium of air-sandwich structure can be prepared by combining two disc-shaped substrates, at least one of which having the above-described structure, by interposing therebetween a ring-shaped inner spacer and a ring-shaped outer spacer, or by utilizing protruded portions provided on one or both of the substrates.

Recording or reproducing of optical information can be carried out using the above-described recording medium by the following method according to the present invention. The present invention is advantageously employed for recording information such as signals of CD format at a low linear speed, so that the case of recording or reproducing signals of CD format will be described below.

In the first place, the information recording medium provided with a tracking guide of grooves which are shallower and narrower than those of conventional media is irradiated with a light for recording the information (i.e., recording light) such as a semiconductor laser beam from the substrate side under rotation of the medium at a fixed linear speed ranging from 1.2 to 2.8 m/sec., to record signals of CD format on the recording layer. As the recording light, a semiconductor laser beam having the wavelength in the range of 750 to 850 nm is generally used. In the information recording medium of the invention, information can be recorded at a recording power of not more than 10 mW.

Under irradiation with a laser beam as described above, pits of 0.70 to 4.0 μm are formed on the recording layer at intervals of 0.70 to 4.0 μm in the form of concentric circle or in the spiral form. Thus, information of EFM signals such as CD format signals are recorded on the recording layer. In the invention, the recording of signals is conducted on the grooves. In this method, recording of information for not shorter than 60 minutes is possible by using the medium of the invention having an inner diameter of 50 mm and an outer diameter of 115 mm.

In the recording procedure of the method of the invention, tracking is extremely well controlled owing to the tracking guide, and the recording of the information on the groove makes it possible to form pits of small size (i.e., effect given by the invention) and record information on the recording layer. If the recording is made on the land portion, the extension of pit is not restrained and the effect of the invention cannot be obtained.

Reproduction of the recorded information can be carried out by irradiating the medium with a semiconductor laser beam from the substrate side under rotation of the medium at the same linear speed as described above and detecting the reflected light. In the recording medium of the invention, the depth of groove is made smaller than that of a conventional one to obtain a high reflectance, and hence the plane surface of the recording layer has a high reflectance of not less than 60%, so that the recorded information can be sufficiently read out by means of a commercially available CD player.

In the recording medium of the invention, since the width of the groove is smaller than that of a conventional one as described before, pits having small width and uniform size are formed on the groove. Accordingly, when the recorded information is reproduced using a three-beam tracking method that is generally employed method for reproducing CD format signals, the tracking servo-gain properties are prominently enhanced and occurrence of unfavorable phenomenon such as sound-skipping caused by environmental influences is reduced, whereby stable reproduction can be obtained.

The information recording medium of the invention and a medium for recording signals of CD format such as CD-ROM and CD-I are basically interchangeable with each other.

Example and comparison examples of the present invention are given below, but these examples by no means restrict the invention.

EXAMPLE 1

Onto a surface of a disc-shaped polycarbonate substrate provided with pre-groove thereon by injection molding [outer diameter: 130 mm, inner diameter: 15 mm, thickness: 1.2 mm, depth of groove (indicated by h in FIG. 1): 410 angstroms, width of groove (indicated by w in FIG. 1): 0.42 μm, refractive index: 1.57] was coated a coating solution containing chlorinated polyethylene [a solution containing chlorinated polyethylene in an amount of 0.3% in a mixture solvent of methyl cellosolve, butanol and isopropanol (12:8:80, in volume)] using a spin coater, and the coated layer of the solution was dried to form an intermediate layer on the substrate.

On the intermediate layer were then vapor-deposited together In, Ges and Au in the ratio of 66:22:12 (In:Ges:Au, by weight), to form a recording layer of 300 angstroms thick on the intermediate layer.

Thus, an information recording medium (optical disc) consisting of a substrate, an intermediate layer and a recording layer, superposed in order, was prepared.

Subsequently, on the groove of the obtained optical disc were recorded read-in information and standard signals generated from EFM encorder (produced by KEN-WOOD Co., Ltd.).

COMPARISON EXAMPLE 1

The procedures of Example 1 were repeated except for varying the depth of the groove (indicated by h in FIG. 1) of the disc-shaped substrate to 750 angstroms and the width of the groove (indicated by w in FIG. 1) to 0.80 μm, to prepare an optical disc.

The same information and signals as described in Example 1 were recorded on the groove of the obtained optical disc.

COMPARISON EXAMPLE 2

An optical disc was prepared in the same manner as described in Comparison Example 1.

The same information and signals as described in Example 1 were recorded on the land portion of the obtained optical disc.

EVALUATION OF RECORDING MEDIUM

Each of the above-obtained optical discs recorded with information was subjected to reproduction procedure using a CD player (CDX-550 of YAMAHA Co., Ltd.), and evaluated on the playability.

In the reproduction of information from the optical disc obtained in Example 1, any sound-skipping did not occur and random access was possible. However, in the reproduction of information from each of the optical discs obtained in Comparison Examples 1 and 2, a number of sound-skippings occurred and random access was impossible.

I claim:

1. An information recording medium comprising a disc-shaped substrate and a recording layer provided thereon, wherein the substrate is provided on its surface with a tracking guide comprising grooves having a depth of 300 to 500 angstroms and a width between 0.3 µm and 0.5 µm, the recording layer has a plane surface having a high reflectance of not less than 60% and EFM signals of CD format are recorded in the recording layer on the grooves by irradiating the recording layer on the grooves with a laser having a wavelength in the range of 750 to 850 nm under rotating the recording medium at a fixed linear speed.

2. The information recording medium as defined in claim 1, wherein the width of the grooves ranges from 0.4 µm to 0.5 µm.

3. The information recording medium as defined in claim 1, wherein the fixed linear speed is in the range of 1.2 to 2.8 m/sec.

4. A method of optically recording and reproducing information on an information recording medium comprising the steps of:

recording EFM signals of CD format on an information recording medium comprising a disc-shaped substrate and a recording layer provided thereon, wherein the substrate is provided on its surface with a tracking guide comprising grooves having a depth of 300 to 500 angstroms and a width between 0.3 µm and 0.5 µm and the recording layer has a plane surface having a high reflectance of not less than 60%, by irradiating the recording layer on the grooves with a laser having a wavelength in the range of 750 to 850 nm under rotating the recording medium at a fixed linear speed, and reproducing the recorded EFM signals of CD format by irradiating the recording layer on the grooves of the information recording medium with a laser beam by a three-beam tracking method using three beams which comprise a main beam for reading out the EFM signals and two sub-beams for tracking arranged before and after the main beam under rotating the recording medium at a fixed linear speed.

5. The method of optically recording and reproducing information as defined in claim 4, wherein the width of the grooves of the information recording medium ranges frown 0.4 to 0.5 µm.

6. The method of optically recording and reproducing information as defined in claim 4, wherein the fixed linear speed for the step of recording is in the range of 1.2 to 2.8 m/sec.

* * * * *